United States Patent [19]

Gore et al.

[11] Patent Number: 5,100,442
[45] Date of Patent: Mar. 31, 1992

[54] GAS SCRUBBER SYSTEM

[75] Inventors: Anthony R. Gore, Farmington Hills; David J. Cole, Canton, both of Mich.

[73] Assignee: Durr Industries, Inc., Plymouth, Mich.

[21] Appl. No.: 693,313

[22] Filed: Apr. 29, 1991

[51] Int. Cl.$^5$ ............................................. B01D 47/10
[52] U.S. Cl. ......................................... 55/240; 55/241; 55/257.2; 55/DIG. 46
[58] Field of Search .............. 55/220, 240, 241, 257.2, 55/257.3, DIG. 46

[56] References Cited

U.S. PATENT DOCUMENTS

| 2,719,705 | 10/1955 | Watson | 55/241 X |
|---|---|---|---|
| 3,516,230 | 6/1970 | Saubesty | 55/241 X |
| 3,795,093 | 3/1974 | Gerhard et al. | 55/240 X |
| 3,884,654 | 5/1975 | de Crevoisier et al. | 55/240 X |
| 4,257,784 | 3/1981 | Gebhard et al. | 55/241 X |
| 4,328,012 | 5/1982 | Telchuk, Jr. et al. | 55/240 X |
| 4,345,921 | 8/1982 | Gustavsson et al. | 55/241 X |
| 4,521,227 | 6/1985 | Gerdes et al. | 55/241 X |
| 4,582,515 | 4/1986 | Eneroth et al. | 55/240 X |
| 4,608,064 | 8/1986 | Napadow | 55/240 X |
| 4,612,025 | 9/1986 | Sampey | 55/241 X |
| 4,700,615 | 10/1987 | Napadow | 55/241 X |
| 4,816,042 | 3/1989 | Olavson | 55/257.2 X |
| 4,885,010 | 12/1989 | Rich et al. | 55/241 |
| 4,952,221 | 8/1990 | Morioka | 55/240 |
| 5,020,470 | 6/1991 | West et al. | 55/240 X |

FOREIGN PATENT DOCUMENTS

| 56-046889 | 11/1981 | Japan | 55/220 |
|---|---|---|---|
| 1111798 | 9/1984 | U.S.S.R. | 55/240 |

Primary Examiner—Robert Spitzer
Attorney, Agent, or Firm—Dykema Gossett

[57] ABSTRACT

An improved gas scrubber system is disclosed in which air from a paint spray booth is mixed with a liquid to remove paint particles and other contaminants in the air. A wall is positioned immediately downstream of an outlet of the gas scrubber and a jet of intermixed water, entrained contaminants and air impinges off of that wall, to separate the majority of water and contaminants. The gas scrubber member has a unique structure such that the air and water are directed through a first portion generally aligned with an inlet and into a second portion which extends at a 90° angle with respect to the first portion. A restriction is formed on the first portion to provide a noise barrier. The gas scrubber member is formed by planar walls to ensure that the water continues to adhere to them under surface tension, and in essentially laminar flow, while in the first portion. A top wall is spaced from a base wall to define the second portion. The top and base wall are configured such that water will continue to adhere to them until reaching a position adjacent the outlet nozzle, ensuring that the turbulent mixing of water and air occurs at the outlet nozzle. Thus, noise from the mixing must travel through a 90° bend and pass the noise barrier provided by the restriction before reaching the paint spray booth. Further, the unique structure ensures that the gas scrubber will be relatively simple to clean and maintain.

28 Claims, 2 Drawing Sheets

GAS SCRUBBER SYSTEM

BACKGROUND OF THE INVENTION

This application relates to a gas scrubber system for removing contaminants in the air in a work area. More particularly, this application relates to an improved gas scrubber system for use in a vehicle paint spray booth which reduces required power and resulting noise over prior art gas scrubbers.

Several modern industrial environments have ongoing processes which result in contaminants in environmental air. Many of these environments require workers to be in them, at least periodically, and thus it is important that the air within the area be cleaned. Further, contaminants in the air must be removed prior to its being vented to atmosphere.

One industrial environment that typically contains air contaminants is a vehicle paint spray booth. In such systems, a vehicle is moved along a conveyor within the booth and paint is sprayed onto the body of the vehicle. Paint particles typically contaminate the air within such a paint spray booth. Although many painting operations are now done by robotic members, operators must still be in the paint spray booths, at least periodically. Also all this air is typically vented to atmosphere. For these reasons, it is necessary that air be removed from the paint spray booth and thoroughly cleaned. Also, since operators are within the booth, it is desirable to clean the air within the booth with a minimum amount of noise.

Prior art gas scrubber systems are known for removing paint particles from the air in a paint spray booth. Typically, a gas scrubber member mixes a liquid with the air. Contaminants in the air are entrained in the liquid, which is separated from the air downstream of the gas scrubber member. One known prior art system is disclosed in U.S. Pat. No. 4,885,010, wherein the disclosed gas scrubber includes a complicated series of walls which creates constrictions to intermix air and water. The water entrains paint particles in the air, and the water and paint particles are removed from the air downstream of the gas scrubber member. Due to the complicated wall structure such a system may be difficult to clean.

Another prior art gas scrubber system is disclosed in U.S. Pat. No. 4,257,784, in which the disclosed gas scrubber includes an inwardly extending member directing the water and air into the gas scrubber, where it eventually encounters a restriction, which forces the water inwardly, mixing it with the air. This restriction is aligned with the inlet, and the paint spray booth. In such a system mixing noises could possibly travel directly back into the paint spray booth, which could be undesirable.

SUMMARY OF THE INVENTION

It is an object of the gas scrubber of the present invention to reduce the noise that reaches a work area. It is further an object of the present invention to reduce the required power to drive the liquid and air into and out of the gas scrubber and to achieve increased mixing efficiency, while at the same time achieving a structure that is relatively simple to clean and maintain.

A disclosed embodiment of the present invention includes a gas scrubber mounted adjacent to a work area containing air to be cleaned. Air and a liquid, preferably water, are directed to an inlet of the gas scrubber, and travel separately through a first portion of the gas scrubber. The first portion includes a pinched restriction having a reduced cross-section compared to portions immediately upstream or downstream thereof to create a noise barrier. The walls are angled such that water continues to adhere to sides of the gas scrubber, preferably in laminar flow, and the water and air are bent through approximately 90° into a second portion. The water adheres to walls of the gas scrubber which form the second portion and is forced away from those walls and into a nozzle where the air is also directed. The air and water intermix turbulently in the nozzle with contaminants, and in particular with paint particles entrained in the water. The mixed water and air jets outwardly of the nozzle and the water and entrained particles are separated from the air.

In a broad sense, the gas scrubber member of the present invention can be envisioned as a member having a restriction of a relatively small cross-section intermediate upstream and downstream portions of greater cross-section, with the restriction pinching the flow and creating a noise barrier. All turbulent mixing of the water and air, which generates the noise in the gas scrubber that is to be prevented from reaching the paint spray booth, occurs in a second portion bent 90° from a first portion. The gas scrubber also has unique structure and configuration that ensures that water directed into the gas scrubber adheres to the walls under surface tension, and does not mix with the air until reaching a position adjacent the nozzle. Before reaching the paint spray booth, the noise thus must travel back through a tortuous path including a 90° bend and the pinched restriction noise barrier which reflects a majority of the noise, muffling its effect.

In a disclosed embodiment of the present invention, a wall is positioned immediately adjacent to the nozzle and the discharging jet of intermixed water, entrained contaminants and air impinges off that wall, such that the majority of water and contaminants are removed from the air.

In a further preferred embodiment of the present invention, the first portion of the gas scrubber system is formed by planar entry walls which extend laterally inwardly from the inlet to the restriction. Planar intermediate walls extend laterally outwardly from the restriction to a planar top wall and generally planar base wall which define the second portion of the scrubber. The planar inner faces of the walls, and in particular the entry and intermediate walls, ensure that the water continues to adhere to those walls under surface tension until it reaches a position adjacent the nozzle. Preferably laminar flow is maintained on the walls. As noted above, it is a goal of this invention that most of the air/water intermixing occur in the second portion.

According to another aspect of the present invention, the base wall of the gas scrubber includes a stepped portion which extends perpendicularly off the nominal plane of the base for a very small distance. This stepped portion is positioned immediately upstream of the nozzle. Although its function is not fully understood, it further reduces the noise reaching the paint spray booth from the gas scrubber member.

Further, the structure provides a gas scrubber that is easy to clean and maintain. All areas within the scrubber are accessible from either the inlet or the outlet nozzle such that one can clean the scrubber without disassembly.

In a most preferred embodiment of the present invention, preferred angles are disclosed for the angles between the entry and intermediate walls of the gas scrubber which improve the efficiency of the system.

The disclosed system not only reduces noises that travel upstream to the paint spray booth, but also reduces the required power to drive the air and water. Further, the system achieves improved mixing and separation over prior art systems.

These and other objects and features of the present invention will be best understood from the following specification and drawings of which the following is a brief description.

DETAILED DESCRIPTION OF THE PREFERRED EMBODIMENT

Figure 1:
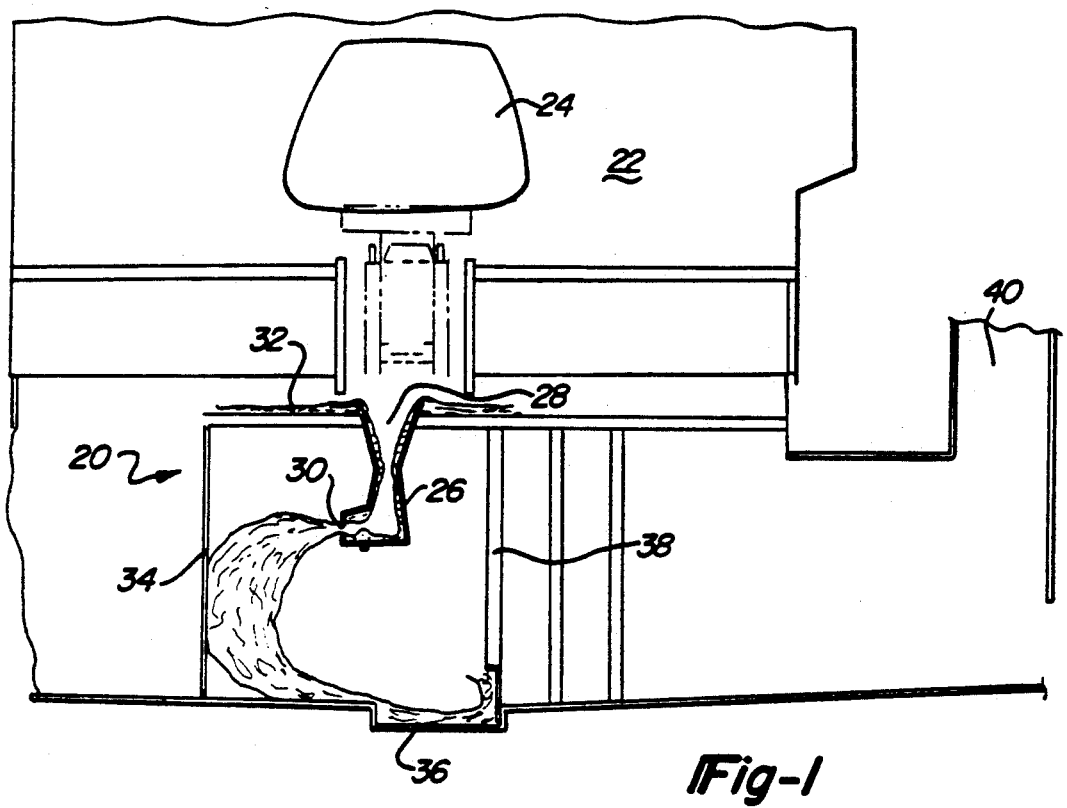
FIG. 1 is a largely schematic view of an inventive gas scrubber system.

Gas scrubber system 20 is illustrated in FIG. 1 for cleaning air within a paint spray booth 22 used to paint vehicles 24. Gas scrubber 26 receives air from spray booth 22 and bends that air through approximately 90° to outlet 30. A source of liquid 32, which is preferably water, directs water into gas scrubber 26. The water adheres to the longitudinally extending walls under surface tension, and preferably in laminar flow and is intermixed with the air adjacent outlet 30. The water entrains paint particles or other contaminants in the air. Outlet 30 is in the form of a nozzle, such that a jet of intermixed water and air is directed outwardly and impinges off adjacent wall 34, which removes the majority of the water and particles from the air. The separated water leaves gas scrubber system 20 through drain 36, and is then treated in a water recirculation system and sent back to water supply 32. The water may be treated by a detackifier, most preferably a metal salts/polymer, as is well known in the art.

After the majority of the water and contaminants has been removed by wall 34, the air passes through a plurality of baffles 38, where further moisture is removed. The cleaned air then passes into outlet plennum 40 and may be vented to atmosphere. As is known in the art, air is typically forced into paint spray booth 22, thus driving air outwardly and into gas scrubber 26.

The use of wall 34 to remove the majority of the water and entrained contaminants in the intermixed air ensures rapid and efficient removal of paint particles and other contaminants from the air. Although gas scrubber 26 uses less water than most prior art systems, it still mixes a large volume of water with the air, and wall 34 facilitates the removal of that water. Further, in a preferred embodiment, wall 34 is spaced from outlet 30 at a optimized distance, such that a worker may physically fit within that distance to clean outlet 30 and the interior of gas scrubber 26.

Figure 2:
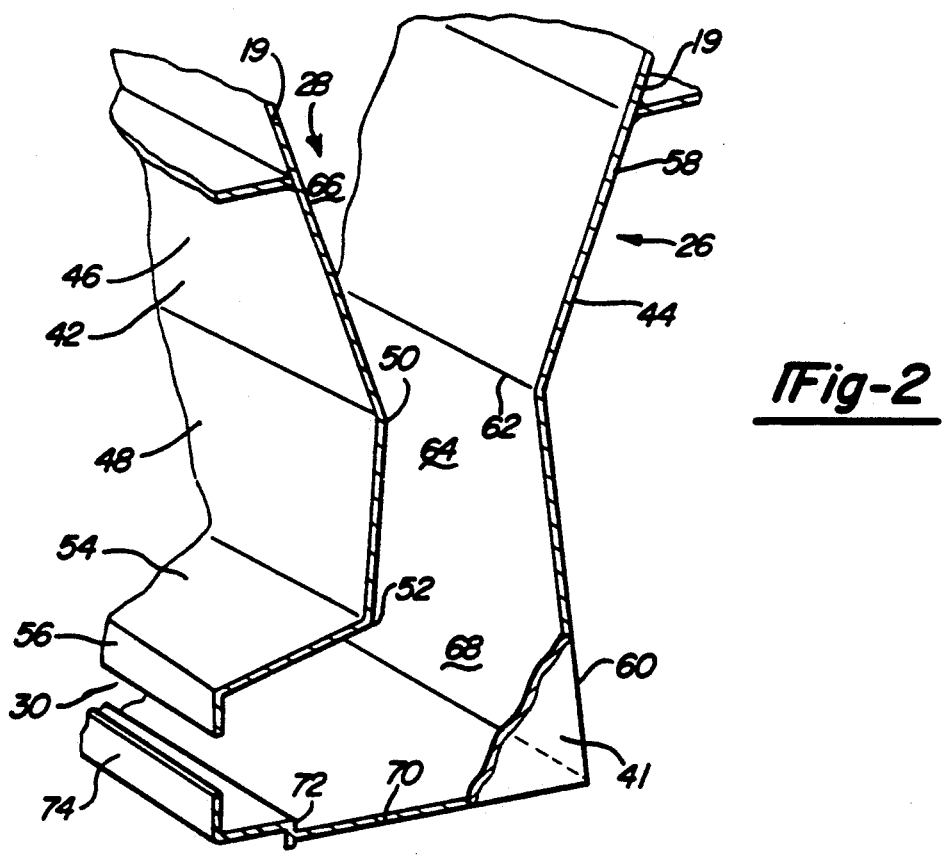
FIG. 2 is a partial prospective view through a portion of an inventive gas scrubber.

FIG. 2 shows details of gas scrubber member 26 which extends longitudinally for a great distance along the travel of vehicle 24. Typically, paint spray booth and gas scrubber 26 would extend for at least 100 feet in this longitudinal direction. Laterally extending walls 41 are disposed at each longitudinal end of gas scrubber 26. Extensions 19 create a three inch weir of water leading into inlet 28.

An outlet longitudinal side 42 includes planar entry wall 46, which extends laterally inwardly to a contact line 50, and planar intermediate wall 48, which extends laterally outwardly from contact line 50. A further contact line 52 connects wall 48 with a top wall 54, which extends to outlet flange 56.

A back longitudinal side 44 includes planar entry wall 58 that extends laterally inwardly to contact line 62 and planar intermediate wall 60 that extends laterally outwardly from contact line 62. Contact lines 50 and 62 define restriction 64 which is a generally planar section of gas scrubber 26 of a first cross-section, less than the cross-sectional area of the gas scrubber upstream of restriction 64 in an entry chamber 66, or the cross-sectional downstream of restriction 64 in an air expansion-water acceleration chamber 68.

Base 70 is formed generally parallel to the plane of inlet 28 and extends away from back intermediate wall 60 in a direction towards outlet intermediate wall 48. Base 70 extends beyond contact line 52 towards outlet 30. Stepped portion 72 extends perpendicular from base 70 in a direction towards inlet 28. Stepped portion 72 is closer to outlet 30 than is contact line 52. Flange 74 extends from stepped portion 72 towards flange 56 to define nozzle outlet 30.

The planer shape of walls 46, 48, 58 and 60, and the respective angles between those walls insures that one can gain access to the majority of their inner surfaces from inlet 28. Further, one can gain access to the remainder of the inner surface of gas scrubber 26 through outlet nozzle 30. In this way the interior of gas scrubber 26 is accessible for easy cleaning and maintenance.

Figure 3:
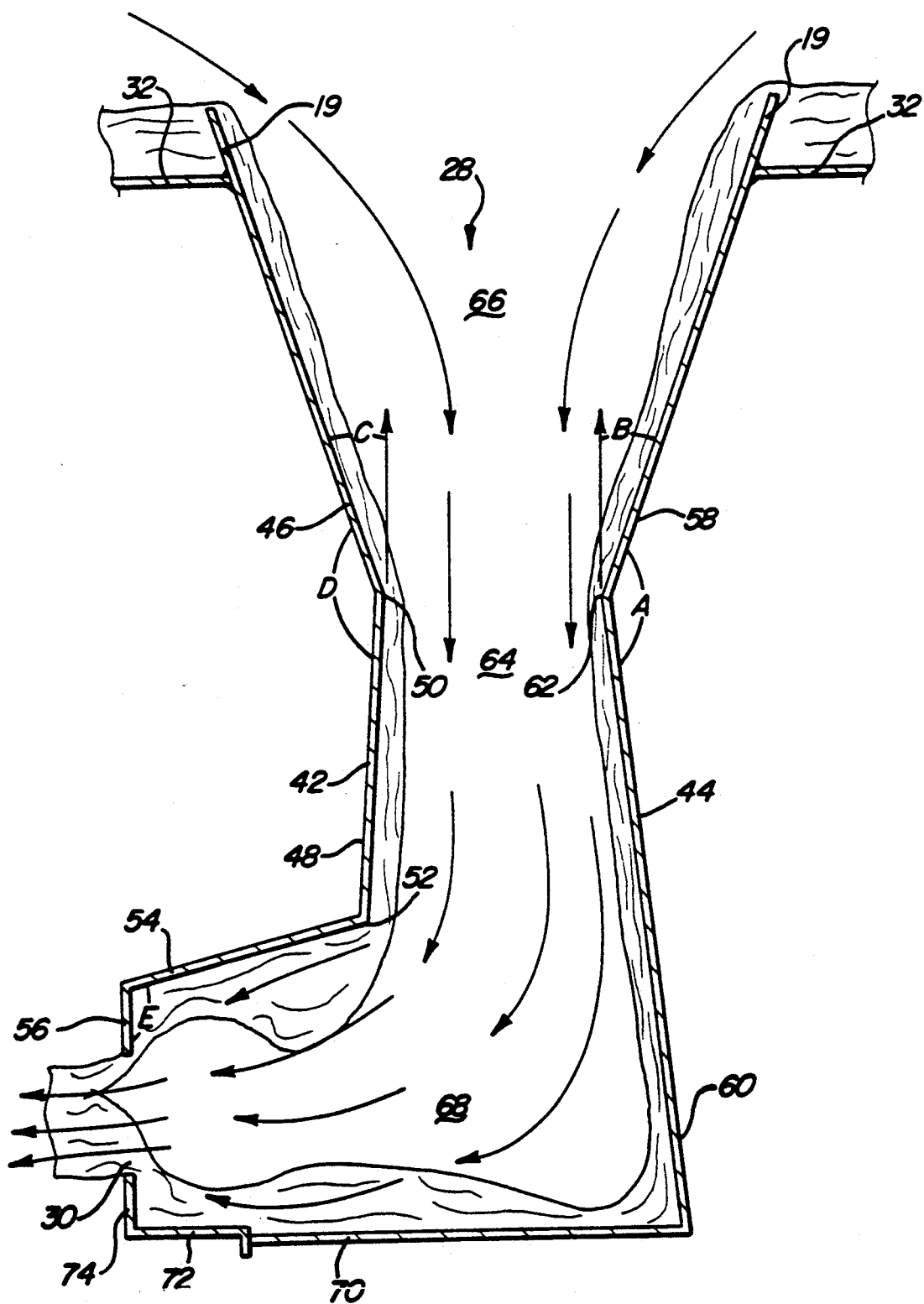
FIG. 3 is a cross-sectional view through an inventive gas scrubber in use.

The operation of gas scrubber 26 will now be discussed with reference to FIG. 3. Air and water enter gas scrubber 26 through inlet 28 but intermixing does not occur until a position adjacent outlet 30. The air passes through a center of entry chamber 66, while the water adheres to entry wall 46 and 58 under surface tension, and preferably in essentially laminar flow. Restriction 64 defines a noise barrier to prevent noises generated by the turbulent mixing at outlet 30 from passing upstream into the paint spray booth. As discussed above, restriction 64 is of a smaller cross-sectional area than immediately adjacent upstream or downstream portions.

Water continues to adhere to back intermediate wall 60 and passes downwardly preferably in essentially laminar flow onto base 70. Water on the outlet side passes around contact line 50 and adheres to intermediate wall 48, passing around contact line 52 and adhering to top wall 54. It has been found that contact 52 should preferably be a line, rather than a graduated curve, since a curve allows reflection of noises back towards the inlet 28. The water on top wall 54 accelerates and continues to pass downstream until flange 56 forces it inwardly towards nozzle 30. Similarly, water adhering to base 70 accelerates and passes over stepped portion 72, where it begins to move upwardly, and to flange 74 where it is forced into nozzle 30. The water forced into nozzle 30 turbulently intermixes with the air to ensure that paint particles within the air are thoroughly entrained in water. The intermixed water and air jet leaves nozzle 30 and impinges upon the wall, as discussed above.

Air passes through a first portion of gas scrubber 26, which could be generally defined as including entry walls 46 and 58 and intermediate walls 48 and 60, and is then bent through a generally 90° angle into a second portion and to outlet 30. Since entry walls 46 and 58 and intermediate walls 48 and 60 are planar, and defined at relatively small angles with respect to a vertical plane, water will flow along those walls, adhering to them under surface tension, and preferably in laminar flow. Thus, substantially all turbulent mixing occurs in the second portion, and noise from the turbulent mixing must travel upstream through a tortuous path to reach the paint booth. The noise is thus greatly reduced. Further, the unique arrangement of the various portions of gas scrubber 26 ensure thorough mixing and thus require lower power to move the air and water. Also, the improved mixing results in more efficient and thorough cleaning of the air. Most importantly, any noise that does travel through the bend in gas scrubber 26, to move in a direction towards inlet 28, will be effectively blocked by the noise barrier created by restriction 64.

Back entry wall 58 preferably defines an angle A with back intermediate wall 60. Further, a plane drawn from contact line 62 perpendicular to the plane of restriction 64 defines an angle B with back entry wall 58. A similar plane drawn from contact line 50 defines an angle C with outlet entry wall 46, while entry wall 46 defines an angle D with outlet intermediate wall 42. These angles A-D have been found to be quite important in ensuring that water adheres to the walls in laminar flow and in achieving improved noise and power reduction with inventive scrubber 26.

Several factors are considered in the inventive determination of desired angles. As an example, it is desirable to have outlet entry wall 46 extending along a plane that is approximately parallel to back intermediate wall 60, such that a cleaning implement can be placed into inlet 28 and clean the inner face of intermediate wall 60. If walls 46 and 60 were on planes extending along greatly different angles relative to each other, it would be difficult to access the interior of wall 60 from inlet 28.

Further, if intermediate walls 48 and 60 extend outwardly at an overly great angle from contact lines 50 and 62, respectively, it is possible that water would begin to break away from the intermediate portions and fall to base 70, beginning turbulent intermixing of the air and water. This is undesirable since it is important to achieve the goals of this invention that water adhere to the sides of gas scrubber 26 in laminar flow until reaching the second section, and preferably outlet 30, where it is turbulently mixed with the air. Lastly, if the intermediate walls 48 and 60 extend outwardly at overly small angles there may be insufficient pinching at restriction 64 to create an effective noise barrier.

Tests on a gas scrubber having the structure similar to that disclosed have indicated that angle A should be about 156°, within a range of about one degree; angles B and C should be about 15° within a range of about two degrees; and angle D should be about 158° within a range of about two degrees. It has been found that if angle A is greater, several undesirable consequences occur. Most importantly, the water begins to fall off of intermediate portion 60, thus creating turbulent mixing earlier then is desired and resulting in noise in the paint spray booth. Further, if angle A were any less there would not be a pinching effect at restriction 64 to provide a noise barrier. For similar reasons, angle D is most preferably 158°. Also, angles B and C have been tested at an angle slightly below 17° (16.73°). however, the water broke away from intermediate walls 48 and 60 after passing restriction 64 and did not adhere to the walls. As discussed above, this is an undesirable result.

Further, angle E is defined between top wall 54 and flange 56. This angle has some effect on the percentage of water that adheres to top wall 54 after passing contact line 52. In practice, it is difficult to achieve 10 percent adherence on top wall 54, and a small amount of water may begin mixing soon after passing line 52. Even so, this relatively small amount of mixing occurs in the second section. In a preferred embodiment, angle E was 105 degrees.

The operation of a gas scrubber system 20 according to the present invention will now be disclosed with reference to the figures. When painting operations are occurring in spray booth 22, some means, such as a fan or blower, of pulling air from spray booth 22 into inlet 28 is operated. Typically, a fan downstream of outlet 40 pulls air outwardly of spray booth 22 and into inlet 28. Water 32 is supplied to inlet 28 and adheres to entry walls 46 and 58 under surface tension, moving downwardly in laminar flow into gas scrubber 26. Both water and air flow are pinched inwardly at restriction 64 to create a noise barrier. The water continues to adhere to intermediate walls 48 and 60 and moves further into gas scrubber 26. At downstream ends of intermediate walls 48 and 60, the water and air flow are both directed through an approximately 90° turn. The water still adheres to base 70 and top wall 54 and moves further downstream. Stepped portion 72 pinches the water from base 70 upwardly while flange 56 begins to pinch the water from top wall 54 towards nozzle 30. Flange 74 pinches the water flow from stepped portion 72 towards nozzle 30 and the water and air are thoroughly turbulently mixed within nozzle 30. The thoroughly mixed water and air jet outwardly of nozzle 30 and off of wall 34.

Thus it will be understood that the walls (46, 48 and 58, 60) are first angled inwardly and then outwardly at angles which maintain the water on the side walls in laminar flow under surface tension. The pinch point or restriction 64 inhibits noise generated in the turbulent mixing zone adjacent outlet 30 from being transmitted back or upwardly through the opening 28 into the work area of the spray booth. A small portion of the contaminants entrained in the air may be absorbed by the flowing water on the side walls. However, the majority of the contaminants are removed in the turbulent mixing zone which is separated from the paint spray booth by the restriction 64.

In a preferred embodiment of the present invention, gas scrubber member was 3 feet 3 inches tall measured from the inlet to the base wall. The inlet extended over a lateral distance of 17 inches, while the restriction was 8 inches. The water level was 3 inches above the top of the inlet. The outlet nozzle was 3¾ inches. The flange from the top wall extended downwardly 2⅜ inches, while the flange from the base extended upwardly 2 inches. The lateral distance between a center line of the restriction and the outlet was 12⅞ inches, while the wall was 4 feet 6 inches from that same center line. The stepped portion extended ⅜ of an inch off of the face of the base. The various angle were as described above. This embodiment achieved surprising reductions in both required same and resulting noise levels.

As can now be appreciated, stepped portion 72 need only extend off base wall 70 by a small amount. In the above example the ratio of the stepped portion height to the nozzle width was only 0.1. The stepped portion reduces noise from the mixing in gas scrubber 26 into spray booth 22. An initial embodiment not having stepped portion 72 did not reduce noise as effectively as the above-discussed embodiment. As such, the inclusion of stepped portion 72 is an important feature of applicant's invention.

A preferred embodiment of the present invention has been disclosed, however, a worker of ordinary skill in the art would recognize that certain modifications would come within the scope of this invention. For this reason, the following claims should be studied in order to determine the true scope and content of this invention.

We claim:

1. A gas scrubber system comprising:

a work area containing air to be cleaned;

a gas scrubber member mounted adjacent to said work area, and having an inlet communicating with and receiving air from said work area, said gas scrubber member further having an outlet located downstream from said inlet;

a source of liquid communicating with said inlet, the liquid being mixed with the air in said gas scrubber and removed from the air downstream of said outlet to remove contaminants from the air;

said gas scrubber member having an entry portion, a restriction downstream of said entry portion and a downstream portion downstream of said restriction, said entry portion, restriction and downstream portion being in a first section of said gas scrubber member where the air and liquid flow in a direction generally perpendicular to said inlet, said restriction being of a smaller cross-sectional area than said entry or downstream portions, and said air and liquid being bent into a second section through an approximately 90° bend downstream of said downstream portion and, wherein substantially all of the mixing of the gas and liquid occurs in said second section;

a planar base wall extending generally parallel to said inlet to define said approximately 90° bend for the air, said base wall extending to a stepped portion which is in said second section and extends in a direction toward said inlet, and generally perpendicularly from said base wall; and said gas scrubber member extending longitudinally and laterally and having two generally longitudinally extending sides and two generally laterally extending sides, with said 90° bend being underneath one of said longitudinally extending sides, defined as an outlet longitudinally extending side, the other said longitudinally extending side being defined as a back longitudinally extending side, said back longitudinally extending side extending downstream to merge with said base wall, and said outlet longitudinally extending side extending to a downstream end of said first section where it merges with a top wall, said top wall and said base directing said air and liquid through said 90° bend and generally perpendicular to said first section, said top wall merging with said outlet longitudinally extending side at a line upstream from said stepped portion.

2. A gas scrubber system as recited in claim 1, wherein said stepped portion and said top wall having flanges at downstream ends extending towards each other to define an outlet nozzle.

3. A gas scrubber system as recited in claim 2, wherein said stepped portion is raised above said base by a first distance, and said flanges on said stepped portion and said top wall are spaced from each other by a second distance to define a nozzle width, the ratio of said first distance to said nozzle width being approximately 0.1.

4. A gas scrubber system as recited in claim 1, wherein said work area is a vehicle paint spray booth.

5. A gas scrubber system comprising:

a work area containing air to be cleaned;

a gas scrubber member mounted adjacent to said work area, said gas scrubber extending longitudinally and laterally and having an inlet communicating air from said work area into said gas scrubber, said gas scrubber further having an outlet;

a source of liquid communicating with said inlet such that the liquid is mixed with the air in said gas scrubber to entrain contaminants in said liquid said liquid being removed from the air downstream of said outlet to remove the contaminants from the air;

said gas scrubber member having a pair of spaced longitudinally extending entry walls extending laterally inwardly, such that downstream ends of said entry walls define a restriction, said restriction being generally of a first cross-sectional area in a plane defined by downstream ends of said entry walls, said entry walls extending at angles that are nonperpendicular to said plane of said restriction, such that a plane drawn parallel to said plane of said restriction, and intersecting said entry walls, has a cross-sectional area greater than said first cross-sectional area, there being a downstream portion of gas scrubber member downstream of said restriction having a cross-sectional area that is also greater than said first cross-sectional area; and said downstream portion being formed by a pair of spaced longitudinally extending intermediate walls, said intermediate walls each extending laterally outwardly from a plane parallel to said plane of said restriction to define said greater cross-sectional area at said downstream portion.

6. A gas scrubber system as recited in claim 5, wherein both said intermediate walls intersect said downstream ends of respective entry walls at a contact line which defines said plane of said restriction.

7. A gas scrubber system as recited in claim 6, wherein an angle is defined between each said intersecting intermediate and entry walls, and the air flow in said gas scrubber is such that said outlet is disposed approximately 90° offset from said inlet, with said air passing beneath one of said intermediate wall, defined as an outlet intermediate wall, the other said intermediate wall being defined as a back intermediate wall, a first of said angles being defined between outer faces of said outlet intermediate wall and said entry wall and a second of said angles being defined by said back intermediate wall and said entry wall, said first and second angles being selected such that liquid adheres to said entry walls and said intermediate walls under surface tension, and in essentially laminar flow.

8. A gas scrubber system as recited in claim 7, wherein said first angle being approximately 158°, and said second angle being approximately 156°.

9. A gas scrubber system as recited in claim 8, wherein said entry walls each extending from said contact lines at an angle of 15° measured from a plane extending from said contact line and perpendicular to said plane of said restriction.

10. A gas scrubber system as recited in claim 5, wherein air passing through said gas scrubber member is bent through an angle of approximately 90° from said inlet to said outlet.

11. A gas scrubber system as recited in claim 10, wherein the air flow bends approximately 90° to said outlet and passes beneath one of said intermediate walls, defined as an outlet intermediate wall, and the other said intermediate wall being defined as a back intermediate wall, said back intermediate wall extending downstream to a base, said base extending generally parallel to said restriction from said back intermediate wall in a direction towards said outlet intermediate wall, and extending beyond said outlet intermediate wall, a top wall extending from a contact line at a downstream end of said outlet intermediate wall, and extending generally on an angle in a direction towards said base.

12. A gas scrubber system as recited in claim 11, wherein said base has a stepped portion extending off of said base in a direction towards said top wall.

13. A gas scrubber system as recited in claim 12, wherein said stepped portion is closer to said outlet than is said contact line of said top wall and said outlet intermediate wall.

14. A gas scrubber system as recited in claim 5, wherein the air flow entering said inlet is bent through approximately 90° to said outlet, and beneath one of said intermediate walls, defined as an outlet intermediate wall, the other said intermediate wall being defined as a back intermediate wall, said back intermediate wall extending in a downstream direction to merge with a base that is generally parallel to said plane of said restriction, said base extending away from said back intermediate wall in a direction toward said outlet intermediate wall, a top wall extending from said outlet intermediate wall at an angle toward said base, and said base having a stepped portion raised off of said base in a direction toward said top wall.

15. A gas scrubber system as recited in claim 5, wherein a separating wall is positioned downstream of said outlet such tat a jet of intermixed water and air exiting said outlet impinges upon said separating wall, and a majority of the water in the air is separated out along with entrained contaminants.

16. A gas scrubber system as recited in claim 15, wherein the air entering said inlet is bent through 90° and out of said outlet with sufficient force to impinge upon said separating wall and separate the water from the air.

17. A gas scrubber system as recited in claim 5, wherein said work area is a vehicle paint spray booth.

18. A gas scrubber system as recited in claim 17, wherein said gas scrubber is mounted beneath said vehicle paint spray booth.

19. A gas scrubber system as recited in claim 5, wherein said entry walls extend at angles selected to maintain said liquid on said entry walls under surface tension and in essentially laminar flow.

20. A gas scrubber system as recited in claim 5, wherein said entry walls having a planar inner face.

21. A gas scrubber system as recited in claim 5, wherein said intermediate walls each having a planar internal face.

22. A gas scrubber system comprising:
a work area containing air to be cleaned;
a gas scrubber member mounted adjacent to said work area, said scrubber extending longitudinally and laterally and having an inlet communicating air from said work area into said gas scrubber member, said gas scrubber member further having an outlet;
a source of liquid communicating with said inlet, the liquid being mixed with the air in said gas scrubber member and removed from the air downstream of said outlet to remove contaminants from the air; and
said gas scrubber member having a pair of opposed longitudinally extending entry walls extending generally laterally inwardly such that downstream ends of said entry walls define a restriction, said restriction being generally of a first cross-sectional area in a plane defined by said downstream ends of said entry walls, a plane intersecting said entry walls and parallel to said plane of said restriction having a cross-sectional area greater than said first cross-sectional area said gas scrubber further having a pair of opposed longitudinally extending intermediate walls extending laterally outwardly of a downstream end of said restriction, said intermediate walls having a planar internal face and extending at an angle nonperpendicular to said plane of said restriction, such that a plane parallel to said plane of said restriction that intersects said intermediate portions will also have a cross-sectional area greater than said first cross-sectional area.

23. A gas scrubber system as recited in claim 22, wherein the air flow entering said inlet is passed through an approximately 90° bend to said outlet.

24. A gas scrubber system as recited in claim 22, wherein said work area is a vehicle paint spray booth.

25. A gas scrubber system comprising:
a work area containing air to be cleaned;
a gas scrubber member mounted adjacent to said work area, said gas scrubber extending longitudinally and laterally and having an inlet communicating air from said work area into said gas scrubber member, and said gas scrubber member further having an outlet;
a source of liquid communicating with said inlet such that the liquid is mixed with the air in said gas scrubber member and removed from the air downstream of said outlet to remove contaminants from the air;
said gas scrubber having a pair of opposed generally longitudinally extending entry walls extending laterally inwardly such that downstream ends of said entry walls define a generally planar restriction of a first cross-sectional area, said entry walls each having an internal planar face and extending at angles that are nonperpendicular to said plane of said restriction such that a plane drawn parallel to said restriction and intersecting said entry walls will have a cross-sectional area greater than said first cross-sectional area, a downstream portion being formed by a pair of opposed generally longitudinally extending intermediate walls, said intermediate walls and said entry walls intersecting at contact lines, said intermediate walls extending laterally outwardly from said plane of said restriction to define a cross-sectional are at said downstream portion that is greater than said first cross sectional area; and
the air flow in said gas scrubber is such that said outlet is disposed approximately 90° offset from said inlet and asid air passes beneath one of said intermediate walls, which is defined as an outlet intermediate wall, the other said intermediate wall being defined as a back intermediate wall, an angle defined between outer faces of said entry wall and said outlet intermediate wall being approximately 158°, and an angle defined by outer faces of said entry wall and said back intermediate wall being approximately 156°.

26. A gas scrubber system comprising:

a work area containing air to be cleaned;

a gas scrubber member mounted adjacent to said work area, said gas scrubber having an inlet for receiving air from said work area, and a source of liquid communicating with said inlet to supply liquid into said gas scrubber, the liquid being mixed with the air in said gas scrubber member to entrain contaminants in the air with the liquid, the mixed liquid and air exiting from said gas scrubber member through an outlet nozzle, the air flowing from said inlet in a first direction and then being bent in a second direction approximately 90° from the first direction prior to exiting said outlet nozzle, substantially all mixing of the air and liquid occurring while said air is directed in said second direction;

a separating wall being positioned immediately downstream of said outlet nozzle such that a jet of intermixed water and air leaving said nozzle impinges on said wall and the majority of said water is removed from said arc along with the contaminants; and wherein there are entry, restriction and downstream portions of said gas scrubber member upstream of said outlet nozzle and in a portion of said gas scrubber where the air is still travelling in said first direction, said restriction being located intermediate said entry and downstream portions and being of a first cross-sectional area that is less than the cross-sectional area of said entry or said downstream portion, said entry portion being formed of a pair of spaced walls extending laterally inwardly from said inlet to said restriction, and said downstream portion being formed of a pair of laterally spaced walls extending laterally outwardly from said restriction.

27. A gas scrubber system as recited in claim 26, wherein the air and water being directed in said first direction by a plurality of planar walls.

28. A gas scrubber system as recited in claim 26, wherein said work area is a vehicle paint spray booth.

* * * * *